US008638674B2

(12) United States Patent
Nugent

(10) Patent No.: US 8,638,674 B2
(45) Date of Patent: *Jan. 28, 2014

(54) SYSTEM AND METHOD FOR CLOUD COMPUTING

(76) Inventor: Raymond M. Nugent, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,958

(22) Filed: Jun. 1, 2012

(65) Prior Publication Data

US 2012/0271874 A1  Oct. 25, 2012

Related U.S. Application Data

(63) Continuation of application No. 12/554,983, filed on Sep. 8, 2009, now Pat. No. 8,238,256.

(60) Provisional application No. 61/095,240, filed on Sep. 8, 2008.

(51) Int. Cl.
*H04L 12/26* (2006.01)
(52) U.S. Cl.
USPC .......................................... 370/242
(58) Field of Classification Search
USPC .................. 370/252, 254, 395.5–395.52; 709/201–203, 217–219
See application file for complete search history.

(56) References Cited

U.S. PATENT DOCUMENTS

2008/0215450 A1\* 9/2008 Gates et al. ..................... 705/26
2009/0276771 A1\* 11/2009 Nickolov et al. ............. 717/177

\* cited by examiner

*Primary Examiner* — Frank Duong
(74) *Attorney, Agent, or Firm* — Antero & Tormey LLC; Peter Tormey

(57) ABSTRACT

A system and method for creating, deploying, selecting and associating cloud computing services from many cloud vendors to effectuate a large-scale information technology data processing center implemented in a software only form. Services may be employed from any number of different service providers and user define policies provides for switching to or aggregating different service providers when necessary. Configurations can be created that allow for service provider selection based on user-selectable parameters such as cost, availability, performance and service level agreement terms. The system employs measurement, aggregation, reporting and decision support of system usage and costing, performance, Service level, feature set, to automate the construction, operation and ongoing management of software based cloud. Drag and drop, non list based UI for the construction and modification of clouds implemented and modeled in software.

20 Claims, 7 Drawing Sheets

SYSTEM AND METHOD FOR CLOUD COMPUTING

BACKGROUND

This application is a continuation of patent application Ser. No. 12/554,983 entitled "System and Method of Cloud Computing" filed Sep. 8, 2009 which further claims the benefit of U.S. provisional patent application 61/095,240, titled "Data Center", filed Sep. 8, 2008 by the same inventor. Both of aforesaid applications are hereby incorporated as if fully set forth herein.

The present invention relates generally to cloud computing, and more particularly to a system and method for creating and managing virtual data centers using online cloud computer services from multiple vendors.

A data center is a facility used to house computer systems and associated components, such as telecommunications and storage systems. It generally includes redundant or backup power supplies, redundant data communications connections, environmental controls (e.g., air conditioning, fire suppression), and special security devices. Developing and maintaining these large data centers require both an initial capital expenditure and a regular operating budget. The cost of creating a data center is one of the major expenses involved in starting a new business—especially on online or Internet business.

Many firms have created data centers coupled to the Internet. Depending on the nature of the industry, these firms may also have surplus capacity. Firms have developed ways to sell this surplus capacity so that other enterprises can access this computing power. This Large-scale computing operation is often referred to as cloud computing. Cloud computing generally means Internet based development and use of computer technology. It is a style of computing where information technology (IT) related capabilities are provided as a service allowing users to access technology-enabled services over the Internet without knowledge of, expertise with, or control over the technology infrastructure that supports them.

Conventionally, cloud computing is a general concept that incorporates software as a service where the common theme is reliance on the Internet for satisfying the computing needs of the users. For example, suppliers of cloud computing services provide common business applications online that are accessed from a web browser, while the software and data is stored on the servers. The cloud computing infrastructure generally consists of services delivered through next-generation data centers that are built on computers and storage virtualization technologies. The services are accessible anywhere in the world, using the network as a single point of access for all the computing needs of clients.

Since clients do not own the infrastructure and are merely accessing or renting, they can avoid the initial capital expenditure and instead consume computing resources as a service. This allows them to only pay for the computing time and resources they actually use. Many cloud computing offerings have adopted the utility computing model which is analogous to how traditional utilities (like electricity) are consumed. By sharing computing power between multiple tenants, utilization rates can be improved because computers are not left idle. In turn, costs can be significantly reduced while increasing the speed of application development. An additional benefit of this approach is that computer capacity rises dramatically as customers do not have to engineer for peak loads.

The drawback to cloud computing is the absence of a uniform protocol for structuring operations. Also different vendors provide different means to access their services. Thus users lack portability when designing for cloud computing.

SUMMARY

Disclosed herein is a system and method for creating, deploying, selecting and associating cloud computing services from many cloud vendors to effectuate a large-scale information technology data processing center implemented in a software only form. Services may be employed from any number of different service providers and user-defined policies provides for switching to or aggregating different service providers when necessary. The user-defined policies may be implemented using a cloud description language (CDL) together with one or more domain specific languages (DSL) which together provide for high level operation and control.

Configurations can be created that allow for service provider selection based on user-selectable parameters such as cost, availability, performance and service level agreement terms. The system employs measurement, aggregation, reporting and decision support of system usage and costing, to automate the construction, operation and ongoing management of software based cloud. Configurations are standardized to allow for vendor neutral operations with the affect that a change in a service provider will not impair operation of a data center. This allows for standardization and portability.

Also disclosed is a drag and drop, non list-based user interface (UI) for the construction, maintenance, operation and modification of cloud-based data centers implemented and modeled according to the disclosure herein.

The construction and method of operation of the invention, however, together with additional objectives and advantages thereof will be best understood from the following description of specific embodiments when read in connection with the accompanying drawings.

DESCRIPTION

Generality of Invention

Figure 1:
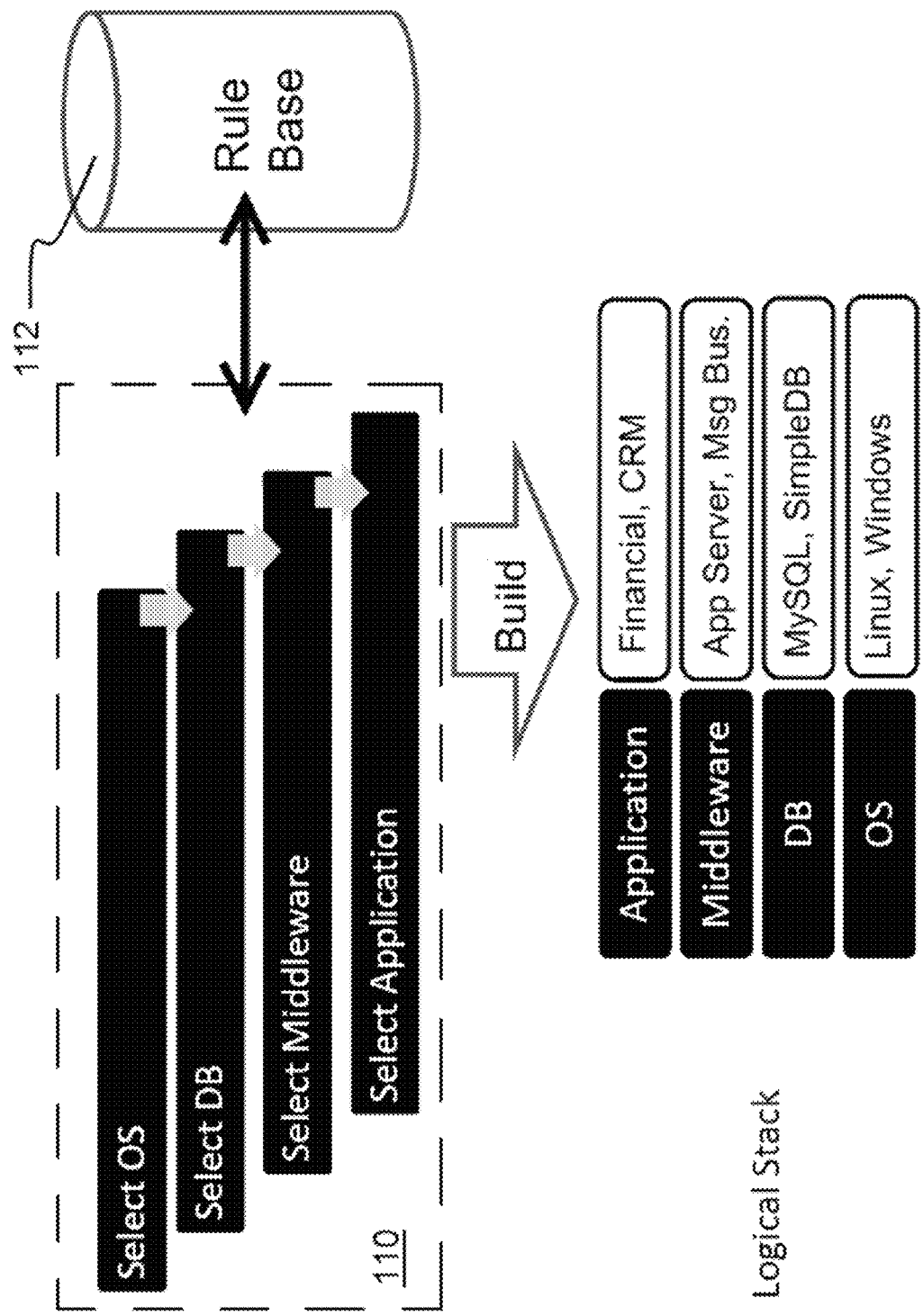
FIG. 1 shows the creation of a logical stack.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The term "declarative language" generally refers to a programming language that allows programming by defining the boundary conditions and constraints and letting the computer determine a solution that meets these requirements. Many languages applying this style attempt to minimize or eliminate side effects by describing what the program should accomplish, rather than describing how to go about accomplishing it. This is in contrast with imperative programming, which requires an explicitly provided algorithm.

The term "service level agreement" (SLA) generally means an agreement between providers for Internet based computing resources such as servers, databases, and data storage systems and clients. SLAs generally contain details about what services are available, pricing for those services and availability for those resources. SLAs may also include workload, queue size, disk space availability, CPU load, network latency, or business metrics such as cost or location.

The word "stack" or "logical stack" generally refers to a set of software subsystems or components needed to deliver a fully functional solution, e.g. a product or service. Often a stack may include an operating system, a server, a data management system and a scripting or other form of programming language. Stacks may be configured in a variety of ways depending on the desire function of the system. Stacks may be collections of elements or they may be represented by pointers (or links) the elements themselves.

The terms "fabric" or "switched fabric" generally refers to a network topology where network nodes connect with each other via one or more network switches and abstracted by one or more layers of software including virtualization at the server level and a hierarchical grouping level.

The term "fault diagnosis," generally refers to software containing methods that can isolate the stack, rack, cluster or module causing the error. Fault isolation may be accomplished by building in test circuits and/or by dividing operations into multiple regions or components that can be monitored separately. After fault isolation is accomplished, services can be replaced. Fault detection differs from fault isolation because fault detection generally means determining that a problem has occurred, whereas fault isolation pinpoints the exact cause or location of the error.

The word "Middleware" generally means computer software that connects software components or applications. The software consists of a set of enabling services that allow multiple processes running on one or more machines to interact across a network. Middleware conventionally provides for interoperability in support of complex, distributed applications. It often includes web servers, application servers, and similar tools that support application development and delivery such as XML, SOAP, and service-oriented architecture.

The term "virtual machine" or "VM" generally refers to a self-contained operating environment that behaves as if it is a separate computer even though is is part of a separate computer or may be virtualized using resources form multiple computers.

The acronym "XML" generally refers to the Extensible Markup Language. It is a general-purpose specification for creating custom markup languages. It is classified as an extensible language because it allows its users to define their own elements. Its primary purpose is to help information systems share structured data, particularly via the Internet, and it is used both to encode documents and to serialize data.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows the creation of a logical stack. In the FIG. 1 a user 110 is coupled to a rule base 112. The rule base 112 supplies instructions for accessing different components that may be required to create a stack. The components are elements of network-enabled services. The instructions may include a description, provider, pricing and availability for the component. Additional services may include disk size and type, RAM, CPU type, CPU speed, number or cores, bandwidth in and out, metrics availability, company organizational hierarchy, cloud features, pricing information, available operating systems, middleware and applications. The rule base also supplies instructions necessary for operating the desired component. These instructions may be in the form of a cloud description language defined herein. Since components are often Internet services, the rule base would provide for drivers or APIs if necessary, for each of the available components.

The user 110, in communication with the rule base, selects the desired components. These components include, but are not limited to an operating system (OS), a database (DB) system, any required middleware and any desired applications. Once the selections are made the logical stack 114 is formed. The logical stack is the set of instructions required for accessing and operating the components. It may include all the necessary information for operation, or alternatively, link to pre-stored information for operating the stack. The logical stack may be stored as a data file, as part of a database or in XML among other possibilities. The logical stacks may be stored in a stack library for reuse at a later time. Alternatively the stacks may be dynamically reconfigurable depending on system needs and resource availability. In addition, a software agent may be employed to locate and present information on the components. This provides for easier operations when cloud resources are not yet fully characterized.

Figure 2:
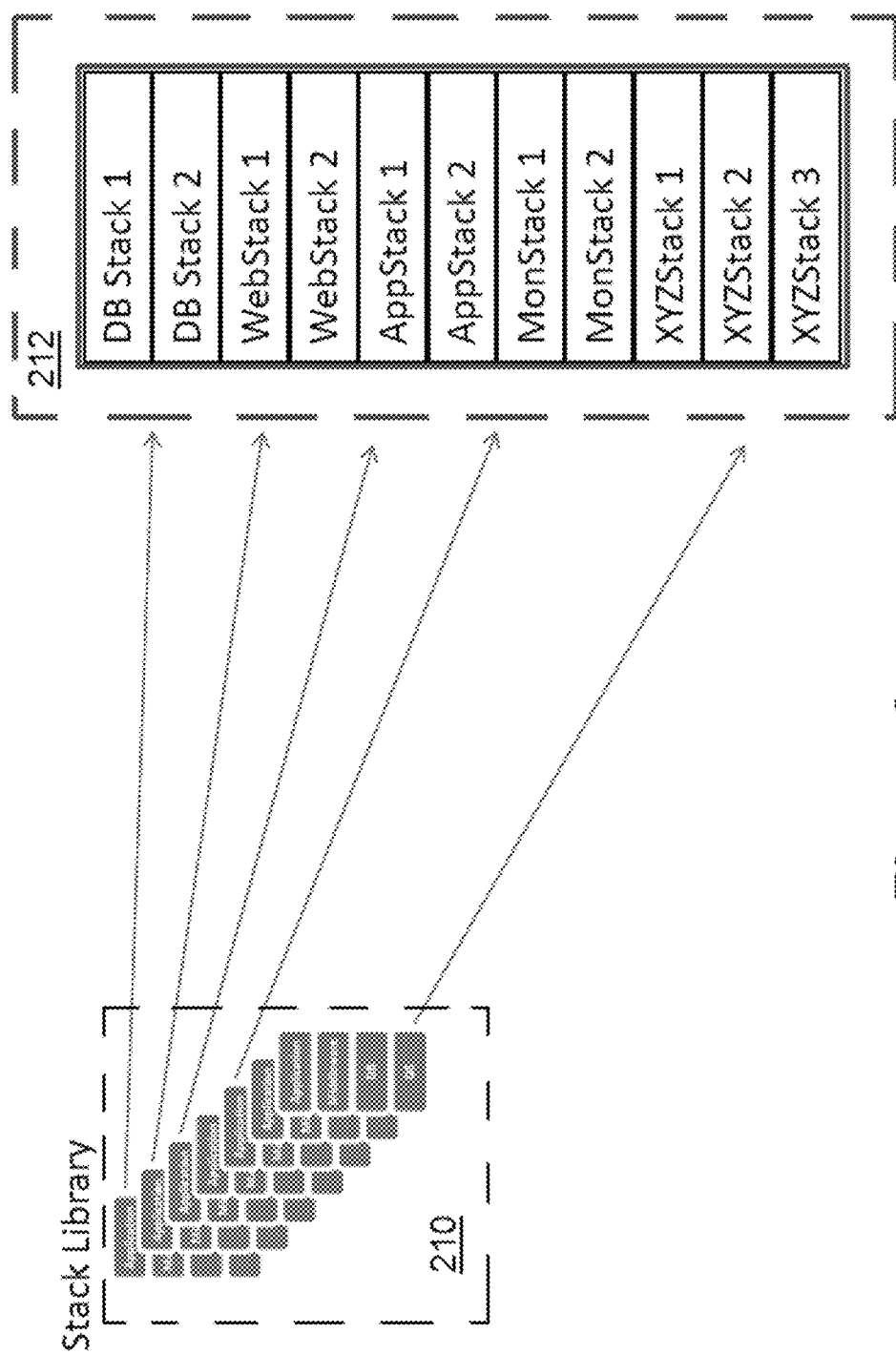
FIG. 2 illustrates the use of a stack library to create a logical rack.

FIG. 2 illustrates the use of a stack library 210 to create a logical rack 212. Racks are collections of components conventionally mounted in a data center and contain the physical elements used to make up a computing system. A logical rack is a collection of system components coupled together through a network without requiring a standard physical location. In the FIG. 2, a user selects from a library comprised of logical stacks to create a logical rack. The rack operates to effect similar functions as would a conventional physical rack and also provides a management framework from controlling and operation of a data center. A software user interface would provide for the elements of the components allowing a user to create racks using a drag and drop interface. As the user configures the rack, code may verify compatibility among system components.

Figure 3:
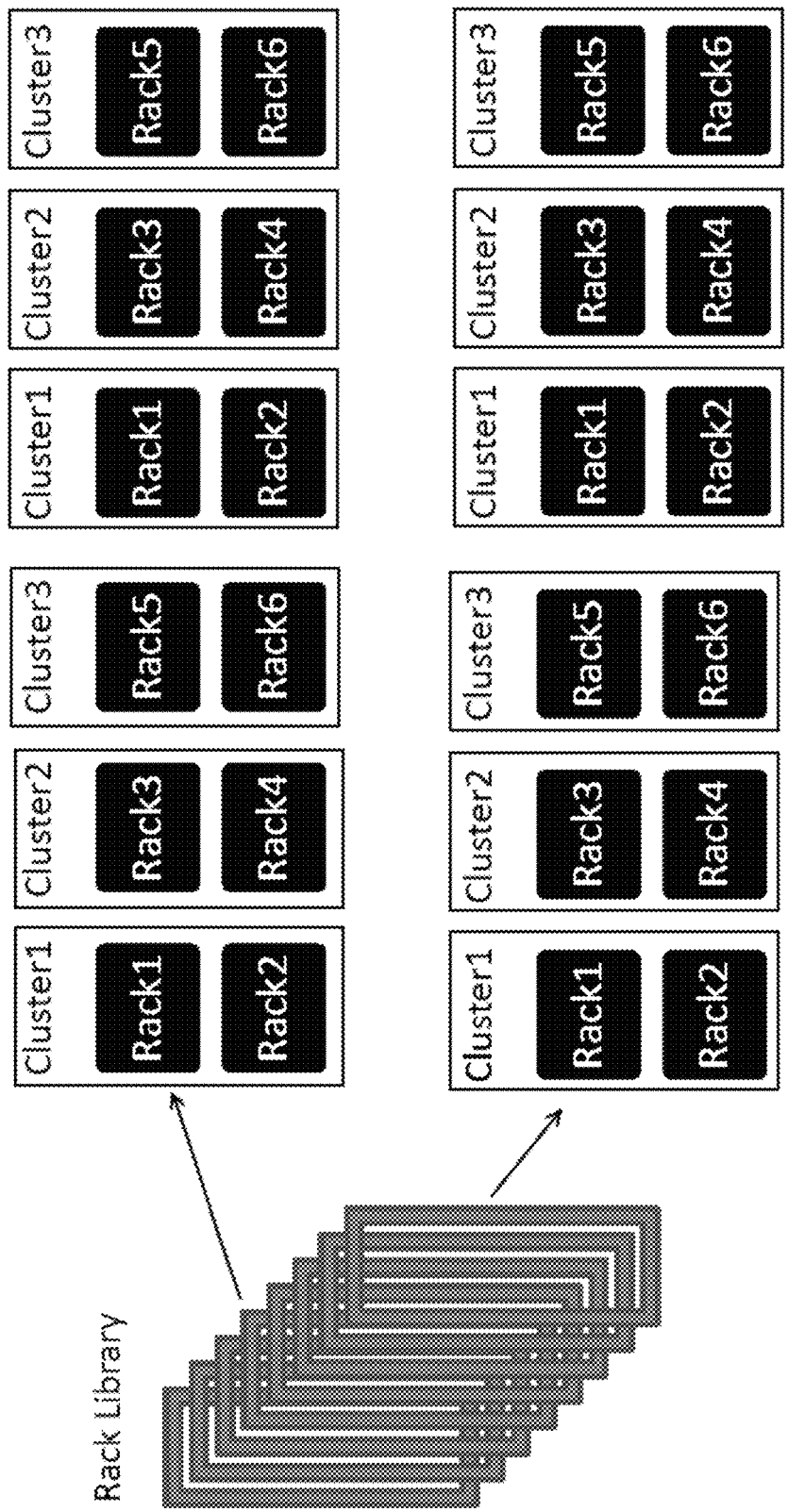
FIG. 3 is an example embodiment of a data center.

FIG. 3 is an example embodiment of a data center. The data center is comprised of clusters, each cluster having one or more racks. Typically, a cluster integrates the resources of two or more computing devices (that could otherwise function separately) together for a common purpose. The data center may be defined as collections of clusters, comprised of one or more racks, which in turn, are collections of stacks, which in turn, are collections of instructions and providers of services available through a network such as the Internet. The data center exists as a structure relating the components together and providing for operations among the various racks. The structure maybe defined in a cloud definition language describe below.

In operation a data center provides for a means to manage the various data services. Organizing racks into clusters allows for large scale deployment, similar to a physical data center. Conventional management tools may be employed for operations management such as fault determination and automatic failover. These objects can then be operated on by applications governing policy, monitoring, billing or provisioning. Additionally a cloud configuration language as define herein may be employed in lieu of or in conjunction with conventional management tools.

In view of the foregoing, one aspect of the current disclosure is the organization of online processing services into an operational hierarchy. As used above racks, stacks and clusters are hierarchical structures, but this disclosure should not be read to limit the invention to only those structures. The inventor contemplates various structures, but racks, stacks and clusters are shown by way of example because of their common usage and relation to physical constructs.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effectuate such feature, structure or characteristic in connection with other embodiments whether or not explicitly described. Parts of the description are presented using terminology commonly employed by those of ordinary skill in the art to convey the substance of their work to others of ordinary skill in the art.

Figure 4:
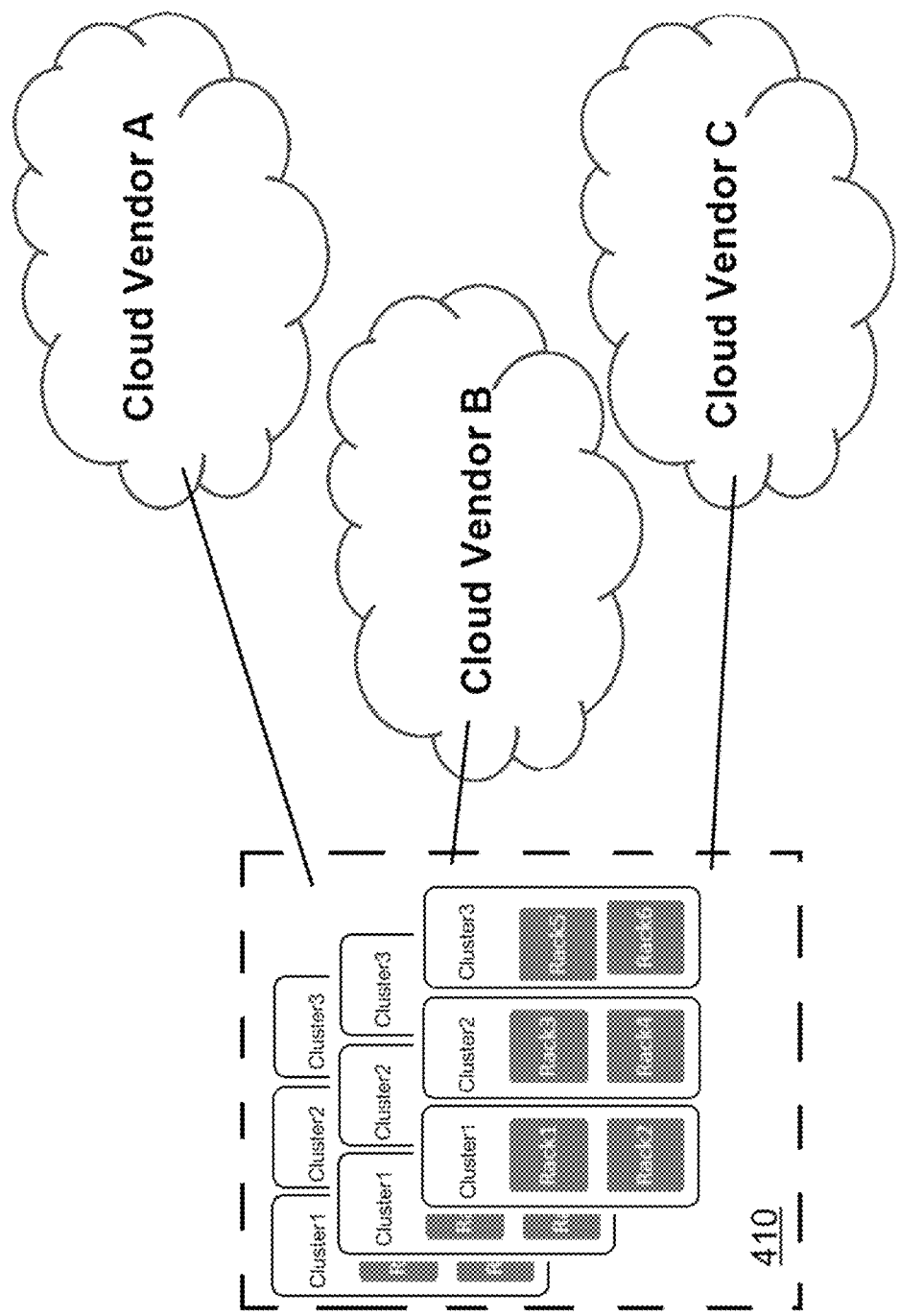
FIG. 4 shows deployment of one embodiment of a data center.

FIG. 4 shows deployment of one embodiment of a data center. The data center, organized into clusters 410, is coupled to one or more cloud vendors. Cloud vendors provide at least one of the computing services required for each stack in the data center. Each cloud vendor provides different levels of services at prices differing from other cloud vendors. As such, deploying the data center may entail optimizing resources to best determine availability, pricing, quality of service and location. Deployment may also use a cloud description language (CDL) as defined herein. The CDL may include price information for each cloud vendor, thus allowing differing vendors to be selected programmatically to effectuate the operations of the data center at the lowest currently available cost.

Figure 5:
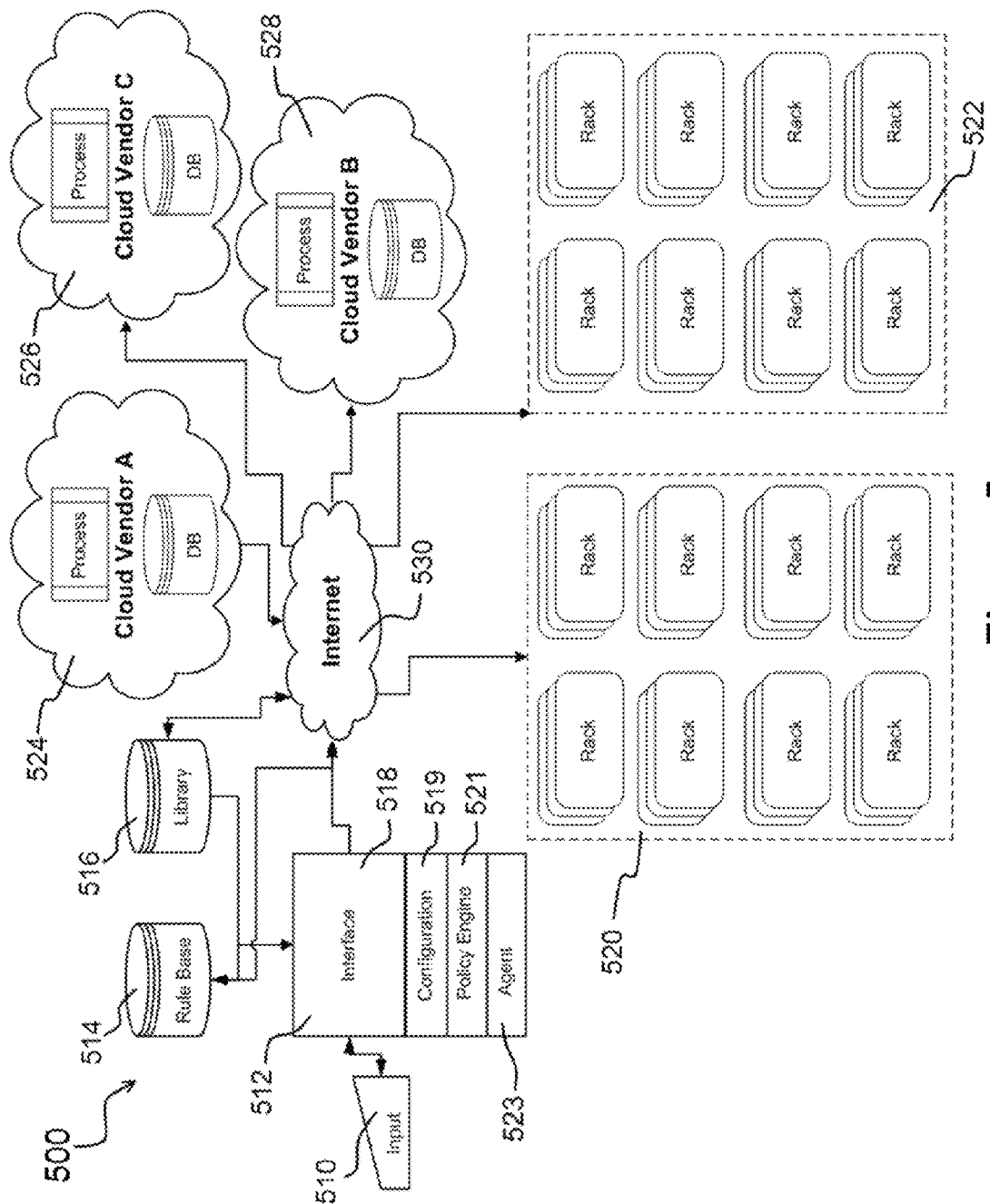
FIG. 5 shows a system embodying an example data center.

FIG. 5 shows a system embodying an example data center. In the FIG. 5, a processor-based system 512 provides an input 510 and an interface 518. The system 512 also provides for control of a configuration which may be stored in local memory (not shown) through a configuration module 519. The system 512 is coupled either directly or through a network such as the Internet 530 to a rule base 514 and to a library 516. The rule base contains rule information provided by cloud vendors 524, 526 and 528. Rule information comprises instructions for accessing different components that may be used for a data center. The components are elements of network-enabled services generally available online through service level agreements (SLAs) with a variety of network service providers. The instructions include a selection of parameters such as a description, provider, pricing and availability for the component. The rule base supplies code necessary for operating the desired component. Since components are often Internet services, the rule base would provide for drivers, if necessary, for each of the available components.

The system 512 provides an interface 510 for a user to manipulate the system 510. The user selects options from the rule base 514 using the interface 518 to create stacks, racks, clusters and other constructs for operating a data center. Constructs are defined by associating rules defined in a domain specific language and associated to cloud vendors via their application programming interface in a logical manner to produce a processing effect. Constructs may also be defined as a service without specifying a particular vendor such that vendor selection is accomplished through later processing stages in accordance with a cloud definition language define below. Once the constructs are defined, they are stored in configuration memory using the configuration module 519 for later deployment. The library 516 provides for creation, storage and maintenance of collections of stacks created by a user. Likewise, racks and clusters are created and stored in the library for later editing or deployment. The configuration memory contains instructions for one or more data centers 520, 522. An agent 523 provides for monitoring of operations and is in communication with a policy engine 521 for deploying one or more agents 523 and processing in accordance with the rule base 514, library 516 and other system resources.

In operation the data centers 520 and 522 are deployed by linking the associated configurations to the cloud vendors 524, 526 and 528 and then initiating operations specified in the configuration data base. The configurations may specify cloud vendors or the system 512 may select a cloud vendor in response to parameters in the configuration language. Cloud vendors may also be selected in response to operational requirements such as lowest price or availability. Other requirements may include geographic preferences, higher performance of computer resources including bandwidths for traffic into and out of the cloud. The system 512 provides for failure detection wherein if a service is not responsive as part of the data center operation an alternative service is brought on line thus providing a failover function.

The interconnection between various cloud vendors 524, 526 and 528 for one or more information technology applications provides a processing fabric because the interconnections may be established dynamically and in parallel during certain operations. In a similar fashion, the creation of configurations is used to shape the fabric to create the desire information technology function.

The interface 518 provides usage and performance statistics of the cloud vendors 524, 526 and 528 allowing a user to create new parameters in response to historical performance characteristics of different cloud vendors. The operation of the system and method for cloud computing allows users to be independent from any particular cloud vendor and also provides an effective tool for cost-effective data processing operations as detailed in the following description.

Cloud Definition Language

A system and method for cloud computing as described herein may be effectuated to include the use of a cloud definition language (CDL). A CDL facilitates operations by providing for implementation of rules bases (described above) and for modeling a datacenter or cloud in software. A CDL would be comprised of code descriptors to implement the functionality of cloud computing. The functionality includes, but is not limited to:

- Implementing computer resources as formulaic expressions in a Domain Specific Language (DSL)
- Federation of computer resources from multiple cloud vendors to create a unified system
- Federation of computer resources from multiple cloud vendors to create one system based on user defined policy.
- Federation of computer resources from multiple cloud vendors to create one system based on aggregated metrics.
- Aggregating metrics to drive automated decision support for management of software based cloud.
- Automated, policy based decision support for creating and modifying clouds including federation of resources from disparate vendors.
- Automated discovery of physical datacenter as means of implementing it in a software cloud and storing as a formula.
- Non-list based, drag and drop UI for building and managing cloud based datacenters.

The CDL could be a declarative language comprising the following type of expressions:

- Type—Resource types (i.e. Cloud, Datacenter, Cluster, Rack, Stack, Computer, Resource)
- Identifier—Identifies a type instance uniquely (i.e. Cluster: NewYork, Rack:MySQLNY)
- Members—the unique configuration of the instance of this Type (i.e. Cloud:AWS, Cluster1, Cluster2, Cluster3, Cloud)
- Operational configurations—specific commands unique to the instance (i.e. AWS:API,
  AllocateAddressResponseType
  AssociateAddressTyp
  AttachVolumeType
  •
  API;

Examples of a formulaic description of a cloud include but are not limited to:

```
Type: Cloud:Cloud1
Cloud1:AWS
   Cluster1:NewYork
      Rack1
      Rack2
      Rack3
   Cluster1;
Rack1:MySQLNY
   Stack1
   Stack2
   Stack3
Rack1;
Stack1;DB
   MySQL
   Linux-Ubuntu
   Collectd
Stack1;
```

The formulaic description of a cloud computing data center may be comprised in part using collections of descriptions of existing hardware components coupled to the Internet. Conventional auto-discovery packages may be employed to locate these resources. These packages use search agents to locate and identify computers, databases and other IT resources. Once located an agent using the constructs described herein translates the resources found in the physical datacenter into one modeled in software. The modeling may take the form of a cloud configuration language, a domain specific language or a combination of the two.

Domain Specific Language

A domain specific language provides for instruction for each domain that may be employed in a data center. These instructions would be unique for each provider of resources. Resource A would use a language specific to it, whereas Resource B would use a language specific to it. By way of example only, if a portion of the data center resources was provided by Amazon computing, those resources would be addressed in an "Amazonese" language. If another portion of resources was provided by Google computing those resources would be addressed in a "Googleese" language. Each provider would have a specific language to effectuate control over resources provided. This allows for a DSL to be adopted dynamically when required by the CDL because a change in service provider could be easily accomplished by a change in the DSL.

One having skill in the art will appreciate that although the resources may provide the same function, they are addressed in a different language. A DSL provides for quickly changing resources by changing the language (for example from Googleese to Amazonese) without requiring changes to instructions higher in a cloud definition language. Each resource provider would have its instruction set, and the CDL would select the appropriate instruction set as conditions require. For example, in the event a fault in a data center is discovered, the CDL would remain the same, but could change resources completely and effectuate the same result using a different DSL.

Policy Operations

The current disclosure also provides for real-time or near real-time policy operations. These policy operations may be implemented dynamically in response to current conditions of the data center. The conditions could be fault detection, pricing information, throughput or other system states. As one example, a policy for fault detection is shown and described herein. Fault detection can automatically switch to an alternative service provider if one is specified, or in the event no specification is provided, the rule base may provide optional service providers for like or similar services. (Changing services providers may be as described above by changing the DSL.) Multiple techniques may be employed to effectuate fault detection and isolation. These include, but are not limited to generating intermediate output that can be examined as well as recording operational steps in a log to assist the troubleshooter to determine which service caused the fault. Intelligent agents may be placed in various nodes or stacks that continuously collect traffic statistics for analysis for detecting and pinpointing the fault. Fault detection methods, such as built-in tests, typically log the time that the error occurred and either trigger alarms for manual intervention or initiate automatic recovery. A fault detection scheme may use programmatic definitions of fault, software modeling of fault scenarios and formulaic actions to be taken in the case of a particular fault. An example of code to implement fault operations is:

```
If cloud1:diskerrs exceeds 100
   Cloudsync:clouda
   Switch: resource:clouda
Cloud1;
```

In the example above, when errors on a disk exceed a predetermined amount (i.e. 100) then a replacement cloud would be switch into the network using a "switch Resource" command of a CDL.

Figure 6:
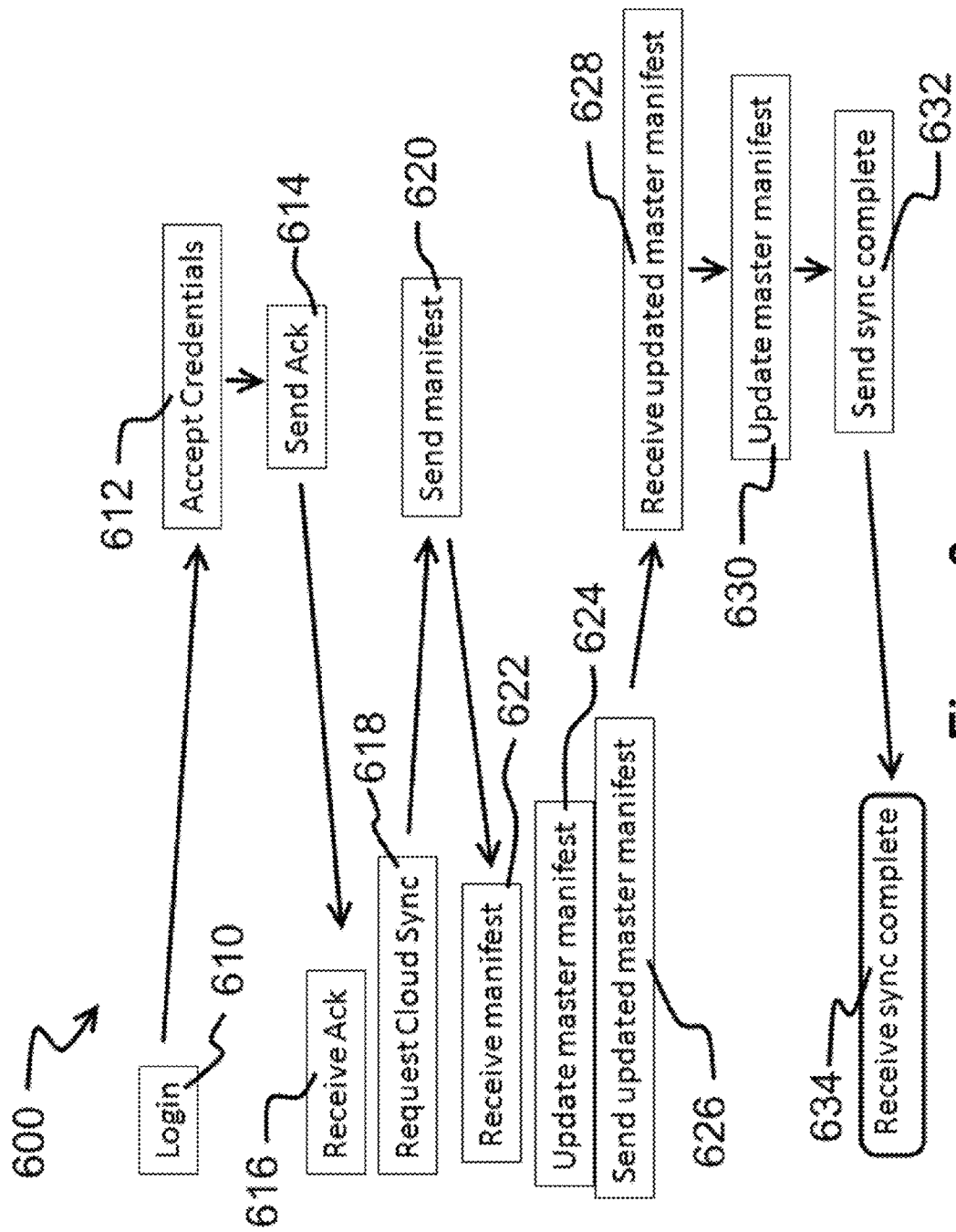
FIG. 6 shows a flowchart of one means for a cloud synchronization.

FIG. 6 shows a flowchart of one means for a cloud synchronization 600. Manifests are kept on each vendor (or cloud service provider) and include at least a record of all computer resources, running resources, library resources, state and usage log. In operation, a user (or agent, which may be another cloud-based data center) would login to the system at a step 610 and the user's credentials would be accepted at a step 612. Acceptance would be from an acknowledgment (ACK) transmitted at a step 614 and received at a step 616. An agent requests synchronization (or an update) at a step 618. In response, the cloud responds with a manifest at a step 620. The agent receives the manifest at a step 622 and reconciles the cloud's manifest with the agent's its own manifest to create a master manifest at a step 624. Once created the agent transmits the master manifest at a step 626 and it is received by cloud at a step 628. The cloud processor updates its master manifest at a step 630 and sends a synchronization complete indication at a step 630. The update or synchronization step is completed at a step 634.

Streaming Data

The system may use streaming fault data from each computer resource to build a list of fault data for each object in a grouping hierarchy. This list is processed in real time using a map/reduce algorithm which results in a small amount of data that is compared to a rule set expressed in a cloud description language (CDL) and loaded into a policy engine. The policy engine, reading the rules set forth by the CDL, takes action accordingly and invokes a compare function such as a "CMP" to compare the state of cloud A with cloud B. In response to this comparison, and depending on the directives expressed in the rules, the engine takes action to migrate computer resources or other actions (including nothing).

Streaming data is generated from agents within a VM and aggregated into a group hierarchy table to represent the status of the group. Conventionally a "proc" directory contains a hierarchy of special files which represent the current state of the kernel. In one operation the agent reads a kernel state from the /proc/(or equivalent) directory of a file system to obtain the state of each individual VM.

Using the example for fault detection and isolation, one having skill in the art will appreciate that streaming data may provide for other parameters with which to effectuate a change in the data center, for example billing or throughout.

Figure 7:
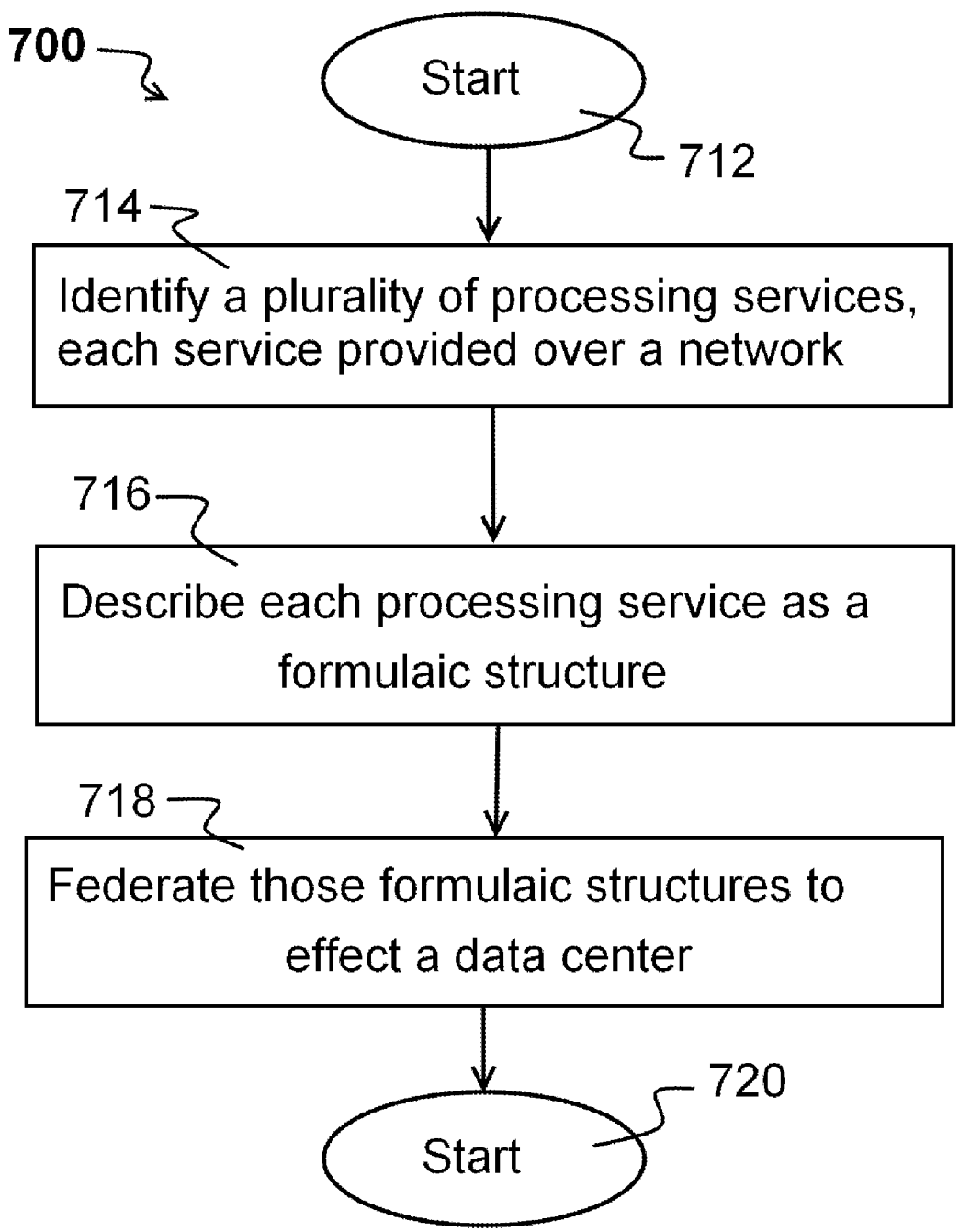
FIG. 7 illustrates a method according to some embodiments of the current disclosure.

FIG. 7 illustrates a method 700. At a flow label 712 the method begins and the method proceeds to a step 714. At a step 714 a plurality of processing services (for example and without limitation those shown in FIG. 1 and others) are identified. This identification may include receiving one or more selections from a user or receiving resource information from a software agent.

At a step 716 those processing services are described as a formulaic structure which may be similar to that described herein in the section labeled Cloud Definition Language. For example and without limitation, the describing may include creating a structured data file, said file including a declarative language representing the nature and operation of the processing service.

At a step 718 those formulaic structures are federated to effectuate a data center. The federating may include aggregating each processing service into a hierarchical structure. One having skill in the art will recognize that the data center of step 718, while a virtual data center, may function similar to a physical data center because it includes a plurality of processing services that can be operated according to the formulaic structure.

At a step 720 the method ends.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A method comprising:
   identifying a plurality of processing services, each service provided over a network;
   describing a first portion of those processing services as a first formulaic structure, said first formulaic structure associated with a first domain;
   describing a second portion of those processing services as a second formulaic structure, said second formulaic structure associated with a second domain, and
   using one of the formulaic structures to provide information technology as a service.

2. The method of claim 1 wherein the network is the Internet.

3. The method of claim 1 wherein the formulaic structure includes a declarative language representing the nature and operation of the processing service.

4. The method of claim 3 wherein the formulaic structure further includes instructions unique to the respective domain.

5. The method of claim 3 wherein the declarative language includes a plurality of resource structures, each resource structure operative to control one or more resources, each resource from a unique service provider.

6. The method of claim 5 wherein the information technology includes at least one of a processing service, a storage service, or a cloud service.

7. The method of claim 6 further comprising:
   monitoring operation of the information technology as a service and dynamically switching between the formulaic structures in response to the results of said monitoring.

8. The method of claim 7 wherein the monitoring includes testing for at least one of a fault condition, a throughput condition, or a price condition.

9. The method of claim 1 wherein the identifying comprises receiving one or more selections from a user.

10. The method of claims 1 wherein the identifying comprises receiving resource information from a software agent.

11. A system comprising:
    a plurality of processing systems communicably coupled through a network, wherein each processing system provides at least one information technology (IT) service;
    an interface coupled to at least one of the processing systems;
    a configuration module in communication with the interface for creation and maintenance of structured data, said structured data including information describing each IT service;
    a policy engine operable to monitor each processing system and allocate resources to a processing system in response to said monitoring.

12. The method of claim 11 wherein the network is the Internet.

13. The method of claim 11 wherein the structured data includes a declarative language, said declarative language including a plurality of resource structures, each resource structure operative to control one or more resources, wherein each resource is from a unique IT service.

14. The method of claim 13 wherein the structured data includes instructions unique to a domain.

15. One or more processor readable storage devices having non-transitory processor readable code embodied on said processor readable storage devices, said processor readable code for programming one or more processors to perform a method comprising:
- identifying a plurality of processing services, each service provided over a network;
- describing a first portion of those processing services as a first formulaic structure, said first formulaic structure associated with a first domain, and
- describing a second portion of those processing services as a second formulaic structure, said second formulaic structure associated with a second domain.

16. The device of claim 15 wherein the step of describing includes: creating a structured data file, said structured data including instructions unique to a domain.

17. The device of claim 15 wherein the step of describing includes: creating a structured data file, said file including a declarative language representing the nature and operation of the processing service.

18. The device of claim 17 wherein the declarative language includes a plurality of resource structures, each resource structure operative to control one or more resources, each resource from a unique service provider.

19. The device of claim 15 further wherein the processing service includes at least one of a storage service, or a cloud service.

20. The device of claim 19 wherein the method further comprises: monitoring operation of the processing services and switching from the first formulaic structure to the second formulaic structure in response to the results of said monitoring.

* * * * *